United States Patent
Hung

(10) Patent No.: US 10,337,780 B2
(45) Date of Patent: Jul. 2, 2019

(54) VARIABLE REFRIGERANT FLOW SYSTEM OPERATION IN LOW AMBIENT CONDITIONS

(71) Applicant: Lennox Industries Inc., Richardson, TX (US)

(72) Inventor: Der-Kai Hung, Dallas, TX (US)

(73) Assignee: Lennox Industries Inc., Richardson, TX (US)

( * ) Notice: Subject to any disclaimer, the term of this patent is extended or adjusted under 35 U.S.C. 154(b) by 615 days.

(21) Appl. No.: 14/930,357

(22) Filed: Nov. 2, 2015

(65) Prior Publication Data
US 2016/0161163 A1 Jun. 9, 2016

Related U.S. Application Data

(60) Provisional application No. 62/089,817, filed on Dec. 9, 2014.

(51) Int. Cl.
| | | |
|---|---|---|
| *F04D 19/00* | (2006.01) | |
| *F25B 13/00* | (2006.01) | |
| *F25B 49/02* | (2006.01) | |

(52) U.S. Cl.
CPC ............ *F25B 49/02* (2013.01); *F04D 19/002* (2013.01); *F25B 13/00* (2013.01); *F25B 2313/007* (2013.01); *F25B 2313/0253* (2013.01); *F25B 2313/02743* (2013.01); *F25B 2500/31* (2013.01); *F25B 2600/0253* (2013.01); *F25B 2600/2513* (2013.01); *F25B 2700/195* (2013.01); *F25B 2700/1931* (2013.01); *Y02B 30/741* (2013.01)

(58) Field of Classification Search
CPC ............... F25B 13/00; F25B 2313/007; F25B 2313/0253; F25B 2500/31; F25B 2700/1931
USPC .......................................................... 62/205
See application file for complete search history.

(56) References Cited

U.S. PATENT DOCUMENTS

| | | | | |
|---|---|---|---|---|
| 3,370,438 A | * | 2/1968 | Hopkinson | ........... F25B 49/027 62/196.4 |
| 3,481,152 A | * | 12/1969 | Seeley | ...................... F24F 5/00 62/183 |

(Continued)

FOREIGN PATENT DOCUMENTS

| | | |
|---|---|---|
| JP | 2009085481 | 4/2009 |
| WO | WO 2014/192140 | 4/2016 |

OTHER PUBLICATIONS

EPO Communication, Application No. 15197153.8-1602 / 3040651, 7 pages, dated Aug. 16, 2016.

*Primary Examiner* — Henry T Crenshaw
(74) *Attorney, Agent, or Firm* — Baker Botts L.L.P.

(57) ABSTRACT

A system comprising a compressor coupled to a first coil through a first valve and a second coil through a second valve, wherein the first coil and the second coil are coupled to a third coil. The system further comprises a fan operable to blow ambient air across the first coil, a first expansion valve coupled to and positioned between the first coil and the third coil and a second expansion valve coupled to and positioned between the second coil and the third coil. The system comprises a controller operable to monitor a pressure of the refrigerant, operate the first expansion valve to reduce refrigerant flow into the first, and operate the second expansion valve to reduce refrigerant flow through the second coil.

16 Claims, 3 Drawing Sheets

(56) References Cited

U.S. PATENT DOCUMENTS

| | | | | |
|---|---|---|---|---|
| 3,631,686 | A * | 1/1972 | Kautz | F24F 3/0525 62/173 |
| 3,918,268 | A * | 11/1975 | Nussbaum | F25B 47/006 62/150 |
| 4,484,452 | A * | 11/1984 | Houser, Jr. | F25B 13/00 62/149 |
| 5,673,570 | A * | 10/1997 | Sada | F04B 39/0207 62/193 |
| 5,823,006 | A * | 10/1998 | Jung | F24F 3/065 62/291 |
| 5,987,916 | A * | 11/1999 | Egbert | F25B 5/02 62/278 |
| 6,318,100 | B1 * | 11/2001 | Brendel | F25B 41/04 62/217 |
| 2006/0032254 | A1 * | 2/2006 | Kim | F25B 13/00 62/197 |
| 2006/0075771 | A1 * | 4/2006 | Tracey, Jr. | F25B 49/005 62/506 |
| 2006/0144060 | A1 * | 7/2006 | Birgen | F25B 13/00 62/151 |
| 2006/0288713 | A1 * | 12/2006 | Knight | F24F 3/153 62/176.6 |
| 2006/0288716 | A1 * | 12/2006 | Knight | F25B 49/027 62/196.4 |
| 2009/0031740 | A1 * | 2/2009 | Douglas | F25B 13/00 62/225 |
| 2010/0233004 | A1 * | 9/2010 | Matsuzaka | F04B 39/06 418/84 |
| 2010/0298982 | A1 * | 11/2010 | Chamorro | H01R 13/6456 700/276 |
| 2012/0036873 | A1 * | 2/2012 | Bush | F24F 1/06 62/81 |
| 2013/0145785 | A1 * | 6/2013 | Nobuhiro | F25B 49/02 62/160 |

* cited by examiner

VARIABLE REFRIGERANT FLOW SYSTEM OPERATION IN LOW AMBIENT CONDITIONS

RELATED APPLICATION

This application claims benefit under 35 U.S.C. § 119(e) of U.S. Provisional Application Ser. No. 62/089,817, titled "Variable Refrigerant Flow System Operation in Low Ambient Conditions," filed Dec. 9, 2014. This application is incorporated herein by reference.

TECHNICAL FIELD

This application is directed, in general, to HVAC (heating, ventilating, and air conditioning) systems, and more specifically to variable refrigerant flow system operation in low ambient conditions.

BACKGROUND

HVAC systems often need to be able to operate in varying environmental conditions. Present HVAC systems operate ineffectively or not at all when an establishment has a cooling demand in conditions where the ambient environmental temperature is also relatively cool. Thus, methods and systems are needed for HVAC systems cool effectively in low ambient temperature conditions.

SUMMARY OF THE DISCLOSURE

A system comprising a compressor coupled to a first coil through a first valve and a second coil through a second valve, wherein the first coil and the second coil are further coupled to a third coil, the compressor being operable to compress refrigerant and pump the refrigerant out of a first compressor opening into the first and second coils and receive the refrigerant through a second compressor opening after the refrigerant has passed through the third coil is disclosed. The system further comprises a fan operable to blow ambient air across the first coil, a first expansion valve coupled to and positioned between the first coil and the third coil and a second expansion valve coupled to and positioned between the second coil and the third coil. Additionally, the system comprises a controller operable to trigger a low ambient temperature mode to monitor a pressure of the refrigerant, in response to determining that the refrigerant pressure is below a threshold pressure, operate the first expansion valve to reduce refrigerant flow into the first coil and increase refrigerant flow through the second coil and into the third coil, and in response to determining that the refrigerant pressure is above a maximum threshold pressure, operate the second expansion valve to reduce refrigerant flow through the second coil and increase refrigerant flow through the first coil and into the third coil.

The present embodiment presents several technical advantages. First, the present embodiment discloses an HVAC system that is operable to effectively cool an environment even when the ambient temperature is low. Second, the HVAC system of the present embodiment is able to function effectively in both low ambient temperatures and regular temperatures. Third, the HVAC system of the present embodiment can be regulated with an intelligent controller which may be adjusted for different temperature settings.

Certain embodiments of the present disclosure may include some, all, or none of these advantages. One or more other technical advantages may be readily apparent to those skilled in the art from the figures, descriptions, and claims included herein.

BRIEF DESCRIPTION OF THE DRAWINGS

For a more complete understanding of the present invention and the advantages thereof, reference is now made to the following Detailed Description taken in conjunction with the accompanying drawings, in which.

DETAILED DESCRIPTION

Cooling operation of HVAC systems can be problematic when the outdoor ambient air temperature is low. Operation during low ambient condition causes the refrigerant pressure throughout the HVAC system to drop, potentially freezing the evaporator coil and leading to unsafe operating conditions for the HVAC system.

Variable Refrigerant Flow (VRF) systems are a type of HVAC system consisting of multiple indoor units and one, or more, outdoor units. VRF systems may be configured for heat pump operation, capable of providing either heating or cooling supply air to a conditioned space through use of a reversing valve, which may change the direction of refrigerant flow through the system components.

Each indoor unit of a VRF system comprises an indoor coil and is configured to condition supply air for delivery to a specific zone of conditioned space within a building. Refrigerant may evaporate as it passes through the indoor coil and absorbs heat from air blown across the indoor coil. Each indoor unit of a VRF system may be paired with an outdoor unit assembly consisting of one or more outdoor units, forming a refrigerant flow circuit. Each outdoor unit may comprise one or more separate outdoor coils. Refrigerant may condense as it passes through the outdoor coils and releases heat to air blown across the outdoor coils. Each of the one or more indoor units of a VRF system may provide conditioned air to a specific, and separate, zone within a building. Each indoor unit may operate independently of the other indoor units, such that some, none, or all of the indoor units may be in operation simultaneously.

The ability to safely accommodate cooling operation in low, or even extra low, ambient outdoor temperatures is an especially desirable feature of VRF systems, particularly VRF systems having several separate indoor units. In a building cooled by a VRF system having several indoor units, for example, a single cooling zone may place a cooling demand on the VRF system while the other zones place no cooling demand on the system. The single zone placing cooling demand on the VRF system may, perhaps, be a server room. In such a setting, the server room may place a cooling demand on the VRF system regardless of the outdoor ambient air temperature.

Present HVAC systems do not accommodate HVAC system cooling operation in extra low ambient outdoor temperatures. The present embodiment addresses this limitation of present HVAC systems without requiring the addition of components to the HVAC system specifically for use only during low ambient operation, such as bypass piping and metering devices, adding to the cost of the HVAC system. The present VRF system accommodates cooling demand at even extra low ambient outdoor air temperatures with little, or no, additional components required to specifically accommodate cooling operation in extra low ambient outdoor temperatures.

Figure 1:
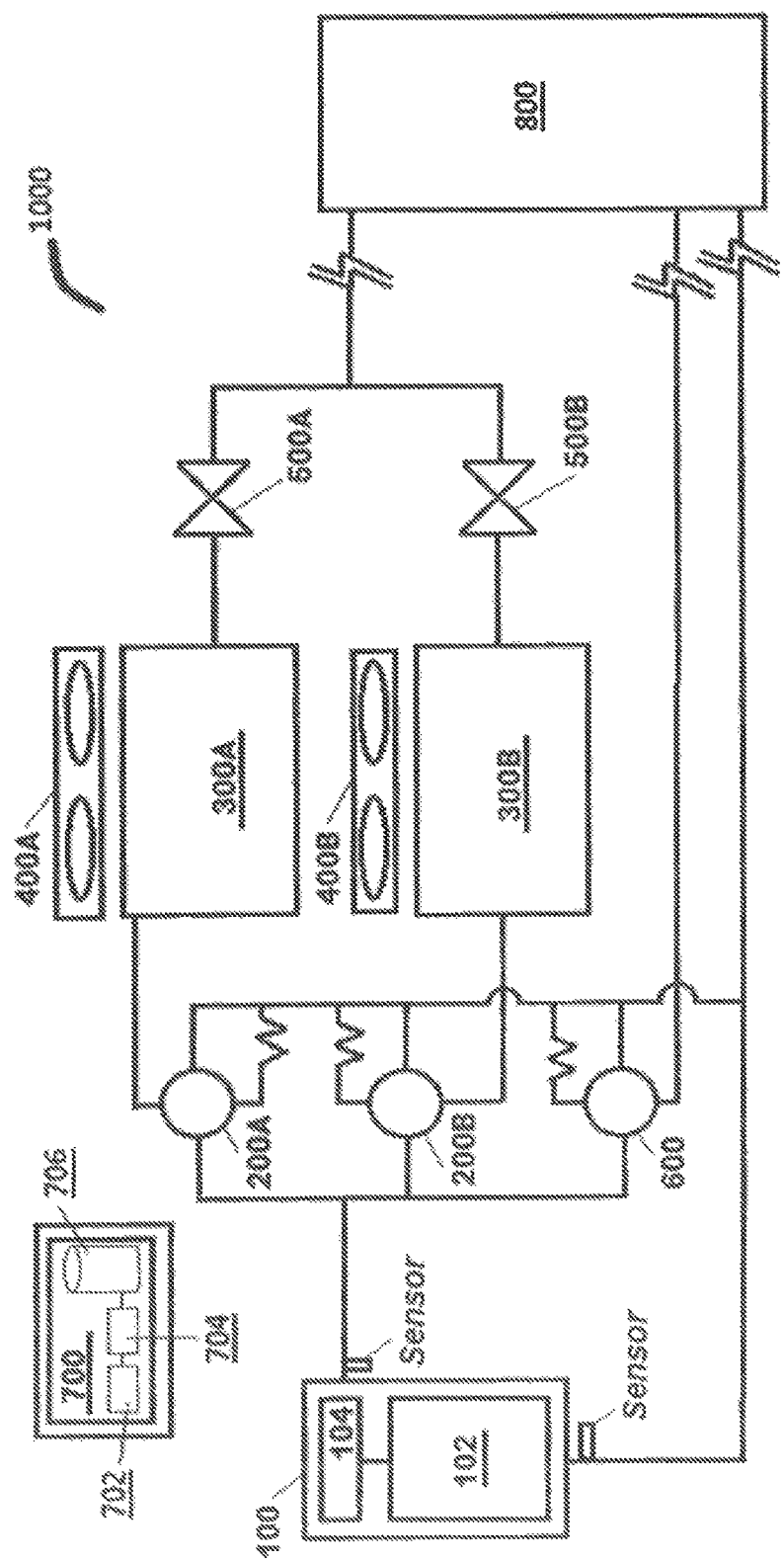
FIG. 1 is a block diagram of a VRF system.

Referring to FIG. 1, a block diagram of the outdoor section components and piping arrangement of a VRF system 1000 according to an embodiment of the present invention is shown. The VRF system 1000 may be a three pipe VRF system configured for heat pump operation and comprising a single outdoor unit, having two outdoor coils, coupled with one or more indoor units (not shown). The VRF system 1000 may include a compressor assembly 100, two valves 200A and 200B, two outdoor coils 300A and 300B, two fan assemblies 400A and 400B, two metering device 500A and 500B, a reversing valve 600, a controller 700, and an indoor coil 800.

The embodiment shown in FIG. 1 corresponds to simplified system components and piping for a single refrigerant flow circuit. In other embodiments, the apparatus and method described herein may be utilized in multi-stage VRF systems have multiple refrigerant flow circuits.

In alternative embodiments, VRF system 1000 may include additional, fewer, or different components than those shown in FIG. 1. For example, in an alternative embodiment, VRF system 1000 may be provided with more than one compressor 100, with more than two valves 200, more than two outdoor coils 300, more than two fan assemblies 400, with more than two metering devices 500, with more than one reversing valve 600, and/or with more than one indoor coil 800 and the like. The VRF system 1000 may, in alternative embodiments, be provided with additional components and associated piping, such as one or more oil separators, one or more crankcase heaters, one or more check valves, one or more refrigerant accumulators, one or more pressure and/or temperature sensors, and the like.

Further, VRF system 1000 components may be located in different sections of the VRF 1000 system than shown. For example, some, none, or all of the system components such as the compressor 100, the valves 200, the metering devices 500, the reversing valve 600, and the controller 700 may be located elsewhere in the VRF system 1000, such as in an indoor section, for example, and not within the outdoor section.

As shown in FIG. 1, the VRF system 1000 may include a compressor assembly 100 for pumping refrigerant from the low pressure to the high pressure sides of a VRF system 1000. The compressor assembly 100 may be configured to pump refrigerant through the VRF system 1000 at a variable flow rate, configured to match VRF system 1000 demand. The compressor assembly 100 may operatively connect to, and receive power and control signals from, the system controller 700.

The compressor assembly 100 may comprise a compressor 102 operatively coupled to a variable speed drive 104 for varying the speed of the compressor 102. The compressor 102 may be of any type, such as a scroll compressor, a reciprocating compressor, or the like. The compressor 102 may include refrigerant temperature and pressure sensors, which may be internal or external to the compressor 102, for sensing one or more operating parameters of the compressor 102, such as refrigerant pressure and/or temperature at the suction and/or discharge of the compressor 102. The sensed operating parameters may be communicated to the controller 700 via wired or wireless communication means.

The variable speed drive 104 may adjust the speed of the compressor 102, varying the flow rate of refrigerant through the compressor 102. The variable speed drive 104 may adjust the compressor 102 speed through any suitable method, such as through frequency modulation of an incoming power signal, voltage modulation of an incoming power signal, or other suitable methods. In an alternative embodiment than that shown in FIG. 1, the variable speed drive 104 may be an internal component of the compressor 102 or, alternatively, incorporated within the system controller 700.

The VRF system 1000 may include valves 200A and 200B for routing refrigerant flow received from compressor assembly 100 through the VRF system 1000. As shown in FIG. 1, the valves 200A and 200B may each be four-way valves configured to route refrigerant flow through the valves 200 along one of two paths, as desired. The valves 200A and 200B may be four way valves of any other suitable type of valve. The valves 200A and 200B may be operatively connected to the system controller 700 for receiving control signals setting the position of valves 200A and 200B.

As shown in FIG. 1, the valve 200A may be paired with the outdoor coil 300A while the valve 200B may be paired with the outdoor coil 300B. This configuration may allow for refrigerant flow to be directed from the discharge of the compressor assembly 100 to either, or both, of the outdoor coils 300A and 300B, depending on the heating or cooling demand to which the VRF system 1000 is operating in response to as well as in response to the ambient outdoor air temperature.

During cooling operation in low, or extra low, ambient air temperatures, the valves 200A and 200B may both be configured to allow refrigerant flow from the discharge of the compressor assembly 100 to both of the outdoor coils 300A and 300B. Allowing refrigerant to flow to both outdoor coils 300A and 300B may provide a "bypass" for a portion of the refrigerant flow during cooling operation in low, or extra low, ambient outdoor air temperatures, as described further below. Those skilled in the art will appreciate that in an alternative embodiment, the four-way valves 200A and 200B may be replaced with a series of shutoff valves, check valves, or the like, and configured to permit refrigerant flow along a desired path in a manner consistent with the methods of the VRF system operation described herein.

Returning to FIG. 1, the VRF system 1000 may include outdoor coils 300A and 300B and indoor coil 800. Outdoor coils 300A and 300B and indoor coil 800 may allow for heat transfer between VRF system 1000 refrigerant by passing outdoor air over outdoor coils 300A and B and indoor air over indoor coil 800. In an embodiment, the outdoor coils 300A and 300B may be identical to one another and to indoor coil 800. Alternatively, in an embodiment, one or more outdoor coils 300 and indoor coil 800 may vary in size, shape, piping configuration, and/or heat transfer capacity from each other.

The outdoor coils 300A and 300B and indoor coil 800 may be implemented with one or more sensor devices for sensing operational conditions of the VRF system 1000, such as refrigerant temperature and pressure, ambient outdoor air temperature, refrigerant flow rate, and the like. These operational conditions may be communicated to the system controller 700 through a wired, or wireless, connection for use in control of the VRF system 1000 components.

The VRF system 1000 may include fans 400A and 400B. The fans 400A and 400B may induce airflow across the outdoor coils 300A and 300B. The fans 400A and 400B may include a plurality of blades that may be rotated about a hub in response to a control signal input to a motor. The fans 400A and 400B may be configured to operate at different speeds and in one of two directions, as desired, to push air across, or draw air through, the outdoor coils 300A and 300B. In some embodiments, one or more indoor fans may also induce airflow across indoor coil 800.

As shown in FIG. 1, the fan 400A may be paired with the outdoor coil 300A while the fan 400B may be paired with the outdoor coil 300B. In alternative embodiments, more or fewer fans 400 may be provided. For example, in an embodiment, a single fan 400 may be provided for inducing airflow across all of the outdoor coils 300. In an alternative embodiment, each outdoor coil 300 may be paired with multiple fans 400. In such an embodiment, the fans 400 may be controlled by the system controller 700 independently, or in concert. Further, the fans 400A and 400B may be configured to operate independently of one another, such that one or more fans 400 may be energized and operated at a desired speed while one or more other fans 400 are de-energized and not rotating.

The fans 400A and 400B may be operably connected to, and may receive control and power signals from, the system controller 700 via a wired or wireless connection. The fans 400A and 400B may be configured for variable speed operation in response to heating and cooling demand on the VRF system 1000 and in response to ambient outdoor air temperatures.

The electrical input to the fans 400A and 400B may be a direct current (DC) input or an alternating current (AC) input. The control signal may be a pulse-width modulated (PWM) signal in which the relative width of pulses determines the level of power applied to the fans 400A and 400B. The revolutions per minute (RPM) of the fans 400A and 400B may have a direct relationship to the width of PWM pulses. Alternatively, the control signal may be the power applied to the fans 400A and 400B which may be switched on and off, with the controller 700 setting the amplitude of the power signal to control the speed of the fans 400A and 400B. Alternatively, the speed of the fans 400A and 400B may be controlled using any suitable methods of fan speed control.

The fans 400A and/or 400B may be operated, in an embodiment, at higher speed to induce more airflow over the outdoor coils 300A and/or 300B, increasing the rate of heat transfer between the VRF system 1000 refrigerant and the outdoor air and reducing the refrigerant head pressure. Operation of the fans 400 at higher speeds may accommodate higher heating or cooling demand on the VRF system 1000 and/or may be in response to sufficiently high ambient outdoor air temperatures, allowing for greater heat transfer at the outdoor coil, or coils, while still maintaining the refrigerant head pressure within a safe range for VRF system 1000 operation.

Conversely, in an embodiment, the fans 400A and/or 400B may be operated at lower speeds, or turned off, to reduce the airflow over the outdoor coils 300A and/or 300B, reducing the rate of heat transfer between the VRF system 1000 refrigerant and the outdoor air, causing an increase in refrigerant head pressure. Operation of one or more of the fans 400 at lower speeds, or turning one or more of the fans 400 off, may accommodate low heating or cooling demand on the VRF system and/or may be in response to cooling operation at low, or extra low, ambient outdoor air temperatures.

During cooling operation at low, or extra low, ambient outdoor air temperatures one or more fans 400 may be turned off, or reduced to a low, or lowest, speed setting, decreasing the heat transfer rate between the VRF system 1000 refrigerant and the ambient outdoor air and reducing the amount of refrigerant head pressure loss as the refrigerant passes through the outdoor coil, or coils, 300A and 300B. According to the embodiment shown in FIG. 1, for example, during cooling operation in low, or extra low, ambient outdoor air temperatures, the fan, or fans, 400A may be configured to rotate at the lowest speed setting while the fan, or fans, 400B may be de-energized.

According to this configuration, the outdoor coil 300A can be described as the "active coil," in which heat transfer between the refrigerant of the VRF system 1000 and the ambient outdoor air is induced through operation of the fan, or fans, 400A. The outdoor coil 300B can be described as the "inactive coil," in which little to no heat transfer between the VRF system 1000 refrigerant and the ambient outdoor air is induced since the fan, or fans, 400B are not energized. Operation of the fans 400 in this manner may allow for continued VRF system cooling operation in low, or extra low, ambient outdoor air temperatures while still maintaining refrigerant head pressures within a safe range for VRF system 1000 component operation since the "inactive coil" functions as a hot gas bypass for the portion of the refrigerant passing through it.

As shown in FIG. 1, the VRF system 1000 may include two metering devices 500A and 500B for controlling the rate of refrigerant flow between VRF system 1000 components and causing a pressure drop of the refrigerant fluid while the VRF system 1000 is operating in heating mode, as part of the vapor compression cycle. In cooling mode, the metering devices 500A and 500B may be, typically, in the fully open position. Either or both of the metering devices 500A and 500B may be expansion valves. These expansions valves may be of any suitable type including electronic expansion valves (EXV). The expansion valves may any valves that regulates the flow of the refrigerant fluid inside VRF system 1000.

In an embodiment, the metering devices 500A and 500B may both be EXVs which may each be operatively connected to, and receive control signals from, the system controller 700 by a wired or wireless connection. The system controller 700 may control each metering device 500A and 500B, adjusting the size of the opening through the metering devices 500A and 500B that the VRF system 1000 refrigerant may flow. The desired setting of each EXV may be determined by the controller 700 in response to received data from temperature and pressure sensors within the VRF system 1000 and system components, sensing ambient outdoor air temperature, refrigerant temperature, refrigerant pressure, and the like. EXV control during operation at low, or extra low, ambient outdoor air temperatures may be provided in accordance with any suitable methods of EXV control.

System controller 700 may have an interface 702, processor 704, and memory 706 for performing the functions of system controller 700. The system controller 700 memory may store VRF system 1000 characteristics such as a maximum pressure level, a threshold pressure level, and a threshold temperature value for triggering a low ambient temperature mode in memory 706. Memory 706 may include any one or a combination of volatile or non-volatile local or remote devices suitable for storing information. For example, memory 706 may include RAM, ROM, flash memory, magnetic storage devices, optical storage devices, network storage devices, cloud storage devices, solid state devices, or any other suitable information storage device or a combination of these devices. Memory 706 may store, either permanently or temporarily, data, operational software, other information for system controller 700. Memory 706 may store information in one or more databases, file systems, tree structures, relational databases, any other suitable storage system, or any combination thereof. Furthermore, different information stored in memory 706 may use any of these storage systems. The information stored in memory 706 may be encrypted or unencrypted, compressed or uncompressed, and static or editable. Memory 706 may store information in one or more caches.

Interface 702 may receive and transmit signals and inputs from and to users, remote sensors, or any other component of VRF system 1000. Interface 702 may also communicate with processor 704 and memory 706. Interface 702 may be any port or connection, real or virtual, including any suitable hardware and/or software, including protocol conversion and data processing capabilities, to communicate through a LAN, WAN, or other communication system that allows system controller 700 to exchange information with any user or component of VRF system 1000. For example, interface 702 may be operable to receive temperature information or pressure information from remote temperature and pressure sensors. A temperature sensor may be any thermometer or other temperature sensing device. The temperature sensor may be alcohol based, mercury based or based on any other suitable material.

Processor 704 may be any electronic circuitry, including, but not limited to microprocessors, application specific integrated circuits (ASIC), application specific instruction set processor (ASIP), and/or state machines, that communicatively couples interface 702 and memory 706 and controls the operation of system controller 700. In some embodiments, processor 704 may be single core or multi-core having a single chip containing two or more processing devices. Processor 704 may be 8-bit, 16-bit, 32-bit, 64-bit or of any other suitable architecture. Processor 704 may comprise an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 704 may include other hardware and software that operates to control and process information. Processor 704 may execute computer-executable program instructions stored in system controller 700 memory. Processor 704 may not be limited to a single processing device and may encompass multiple processing devices.

During cooling operation during low, or extra low, ambient outdoor air temperatures, the metering devices 500A and 500B may be commanded to a desired setting by the system controller 700. The desired settings may be those corresponding to a rate of refrigerant flow passing through each of the "active" and "inactive" outdoor coils. As shown in FIG. 1, for example, the size of the opening through the metering device 500A may be increased, or decreased, to permit more, or less, of the VRF system 1000 refrigerant from the outdoor coil 300A, which may be configured to be an "active coil," to flow to the indoor sections of the VRF system 1000. Similarly, the size of the opening through the metering device 500B may be increased, or decreased, to permit more, or less, of the VRF system 1000 refrigerant from the outdoor coil 300B, which may be configured to be an "inactive coil," to flow to the indoor sections of the VRF system 1000.

In this manner, the controller 700 may adjust the mix of refrigerant flow passing from the outdoor coils 300A and 300B to the indoor sections of the VRF system 1000, controlling the amount of refrigerant "bypassing" the "active coil" to influence the overall head pressure of the mixed refrigerant routed to the indoor units of the VRF system 1000. According to the example described above, and in reference to FIG. 1, adjusting the settings of the metering devices 500A and 500B to permit more refrigerant flow through the "active coil" 300A may cause a reduction in refrigerant head pressure for the mixed refrigerant routed to the indoor units of the VRF system 1000. Conversely, adjusting the settings of the metering devices 500A and 500B to permit more refrigerant flow through the "inactive coil" 300B may cause an increase in refrigerant head pressure for the mixed refrigerant routed to the indoor units of the VRF system 1000.

The VRF system 1000 may include a reversing valve 600 for setting the direction of flow of refrigerant in the VRF system in one of two directions, as desired, and in accordance with any suitable methods of heat pump operation. Although the VRF system 1000 shown is configured for heat pump operation, the present disclosure may be implemented in a VRF system not comprising a reversing valve 600 and configured to accommodate refrigerant flow in only one direction.

The VRF system 1000 may be provided with a system controller 700 for controlling operation of VRF system 1000 components, including the compressor assembly 100 components, the valves 200A and 200B, the fans 400A and 400B, the metering devices 500A and 500B, and the reversing valve 600, as well as other components comprising the VRF system 1000 not shown in FIG. 1. The controller 700 may be connected to the VRF system 1000 components via wired or wireless connections. The controller 700 may be implemented with hardware, software, or firmware defining methods of VRF system 1000 control operation. Further, the controller 700 may be implemented with logic for VRF system 1000 control during cooling operation in low, or extra low, ambient outdoor air temperatures in accordance with the method shown in FIG. 2.

Figure 2:
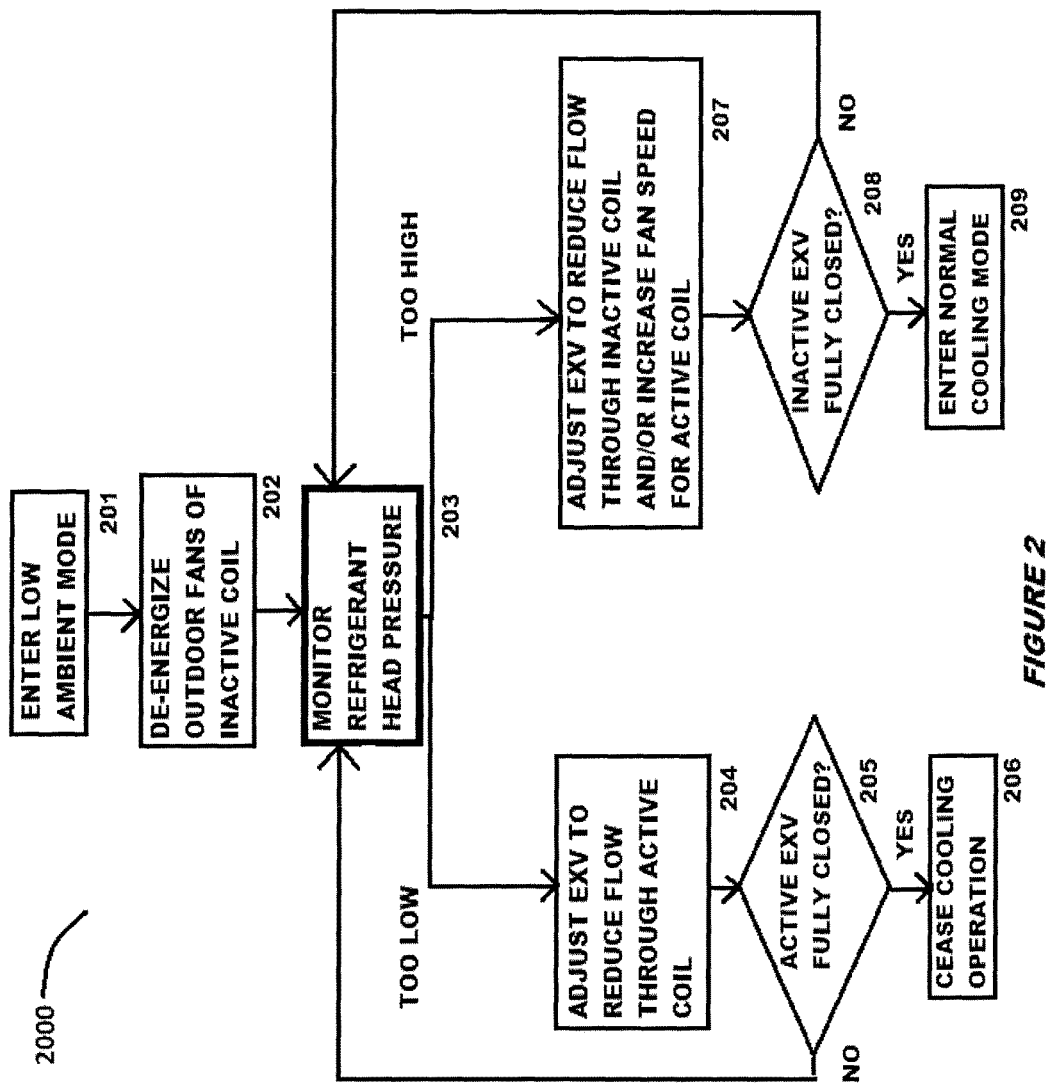
FIG. 2 is a flow chart of a method of control of the VRF system in cooling operation during low, or extra low, ambient conditions.

Turning now to FIG. 2, the controller 700 may control the VRF system 1000 components according to the flowchart shown in FIG. 2 during cooling operation in low, or extra low, ambient outdoor air temperatures. At step 201, the VRF system 1000 may enter low ambient cooling mode in response to input to the controller 700 from one or more system sensors sensing temperature, pressure, VRF system demand mode, and the like in accordance with control logic defining the VRF system 1000 operation that may be stored within the controller 700 memory. The VRF system 1000 may be configured to enter low ambient mode at times when the VRF system 1000 is operating in normal cooling mode, with the fans 400 set to their lowest speed settings, and upon the controller 700 sensing that the refrigerant head pressure in the VRF system 1000 is too low for safe operation in normal cooling mode.

At step 201, the controller 700 may configure the valves 200A and 200B to route refrigerant flow from the compressor assembly 100 discharge to the outdoor coils 300A and 300B. The controller 700 may set the metering devices 500A and 500B to the fully open settings, allowing maximum refrigerant flow through each leg of the VRF system 1000 piping.

At step 202, the controller 700 may configure the outdoor coil 300B to be an "inactive coil" by de-energizing the fans 400B so that no ambient outdoor air flow is induced over the outdoor coil 300B. At step 203, the controller may monitor VRF system 1000 refrigerant pressure throughout the VRF system 1000 using system sensors sensing refrigerant pressures and temperatures according to any suitable methods. The controller 700 may compare the sensed refrigerant pressure to a range of threshold values of refrigerant pressure defining a safe range of refrigerant pressures for the VRF system 1000 to continue cooling operation.

If the controller 700 determines that the refrigerant head pressure of the VRF system 1000 is too low for safe cooling operation, the controller 700 may generate a control signal adjusting the setting of the metering device 500A at step 204. The controller 700 may close the "active" EXV by a predetermined number of steps, routing less of refrigerant flow passing through the "active coil," to the indoor units of the VRF system 1000. Choking the refrigerant flow from the "active coil" in this manner may increase the refrigerant pressure of the mixture of refrigerant flows from the outdoor coils that is routed to the indoor units of the VRF system 1000 as the ratio of condensed refrigerant to "bypassed" refrigerant is adjusted to increase the relative amount of "bypassing" refrigerant.

Alternatively, at step 204, the controller 700 may determine that the head pressure of the VRF system 1000 is lower than desired. The controller 700 may adjust the setting of the "inactive" EXV, opening it to allow more refrigerant routed through the "inactive coil" to pass through to the indoor units of the VRF system 1000, causing an increase in system head pressure. This alternative control option may only be available to the controller 700 in instances where the operating conditions are fluctuating, such that the controller 700 may have closed the "inactive" EXV in response to sensed conditions at some earlier point in VRF system 1000 operation.

The controller 700 may detect the setting of the metering device 500A at step 205. If the "active" EXV has been closed in response to the controller detecting too low refrigerant head pressure to the point where the "active" EXV is fully closed, the controller 700 may cease cooling operation of the system 700 at step 206, by de-energizing the compressor assembly 100 and fans 400A, to prevent damage to system components that may be caused by operation at refrigerant pressures outside of a defined safe range. Alternatively, the controller 700 may respond by altering the setting of the "inactive" EXV, partially closing it to choke the refrigerant flow through the "inactive" EXV to increase the head pressure. Alternatively, the controller 700 may continue cooling operation with the "active" EXV closed for a period of time while monitoring the refrigerant pressure. If the "active" EXV is not in the fully closed setting, the controller 700 may continue to monitor refrigerant head pressure at step 203.

If, at step 203, the controller 700 detects that the refrigerant head pressure is too high, the controller 700 may adjust the metering device 500B to reduce flow through the "inactive coil," the outdoor coil 300B. The controller 700 may close the "inactive" EXV by a predetermined number of steps, routing less of refrigerant flow passing through the "inactive coil," to the indoor units of the VRF system 1000. Choking the refrigerant flow from the "inactive coil" in this manner may decrease the refrigerant pressure of the mixture of refrigerant flows from the respective outdoor coils that is routed to the indoor units of the VRF system 1000 by manipulating the ratio of "condensed" refrigerant and "bypassed" refrigerant to reduce the amount of "bypassing" refrigerant.

Alternatively, or additionally, at step 207 the controller 700 may increase the speed of the fans 400A, inducing more ambient air flow over the "active coil," the outdoor coil 300A, and causing a reduction in the refrigerant head pressure for the portion of the refrigerant routed through the "active coil," the outdoor coil 300A.

In yet another alternative, at step 207 the controller 700 may adjust the setting of the "active" EXV to allow more refrigerant routed through the "active coil," the outdoor coil 300A to pass through to the indoor units of the VRF system 1000. This alternative control option may only be available to the controller 700 in instances where the operating conditions are fluctuating, such that the controller 700 may have closed the "active" EXV in response to sensed conditions at some earlier point in VRF system 1000 operation.

The controller 700 may detect the setting of the metering device 500B at step 208. If the "inactive" EXV has been closed in response to the controller 700 detecting too high refrigerant head pressure to the point where the "inactive" EXV is fully closed, the controller 700 may cease cooling operation of the system 700 in low ambient mode, and commence operation in normal cooling mode at step 209.

Figure 3:
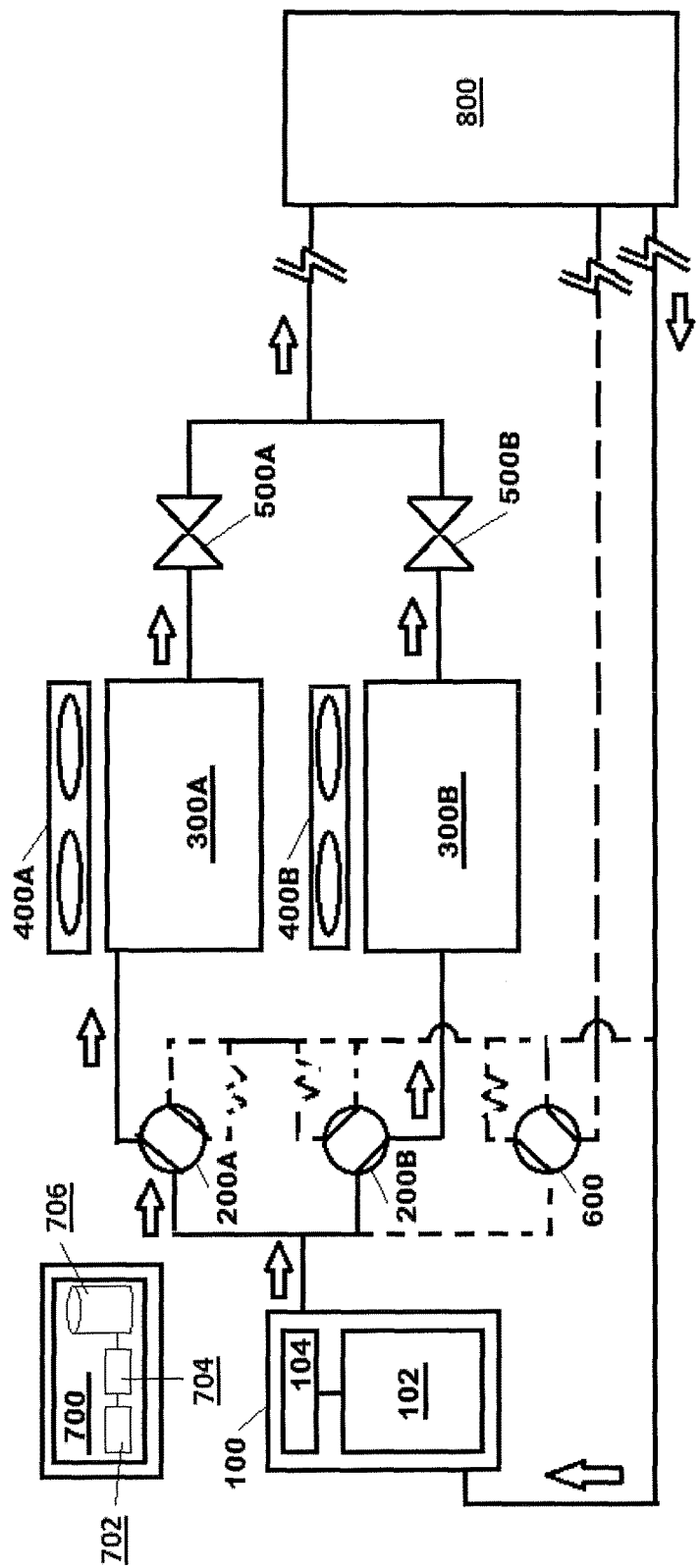
FIG. 3 is a refrigerant flow diagram during operation of VRF system in cooling operation during low, or extra low, ambient conditions.

Turning now to FIG. 3, the refrigerant flow routing through the VRF system 1000 during low ambient operation, as described by the method 2000 of FIG. 2, is shown. As shown in FIG. 3, the VRF system 1000 refrigerant may be routed along the path shown in solid lines, and in the directions indicated by arrows. Refrigerant may be configured to flow from the compressor assembly 100, through both valves 200A and 200B to the outdoor coils 300A and 300B. The metering devices 500A and 500B may be adjusted by the controller 700 to control the flow of refrigerant from each outdoor coil, 300A and 300B, respectively, permitted to pass to the indoor units of the VRF system 1000. Controlling the respective rates of refrigerant flow in this manner may allow the controller 700 to adjust the refrigerant mixture ratio to manipulate the refrigerant head pressure in the VRF system 1000, maintaining the refrigerant head pressure within a safe range for VRF system 1000 operation when operating in cooling mode in low, or extra low, ambient outdoor air temperatures.

Modifications, additions, or omissions may be made to the systems, apparatuses, and processes described herein without departing from the scope of the disclosure. The components of the systems and apparatuses may be integrated or separated. Moreover, the operations of the systems and apparatuses may be performed by more, fewer, or other components. The methods may include more, fewer, or other steps. Additionally, steps may be performed in any suitable order. Additionally, operations of the systems and apparatuses may be performed using any suitable logic. As used in this document, "each" refers to each member of a set or each member of a subset of a set.

Although several embodiments have been illustrated and described in detail, it will be recognized that substitutions and alterations are possible without departing from the spirit and scope of the present disclosure, as defined by the appended claims. To aid the Patent Office, and any readers of any patent issued on this application in interpreting the claims appended hereto, applicants do not intend any of the appended claims to invoke 35 U.S.C. § 112(f) as it exists on the date of filing hereof unless the words "means for" or "step for" are explicitly used in the particular claim.

The invention claimed is:

1. A system comprising:
   a compressor coupled to a first coil through a first valve and a second coil through a second valve, wherein the first coil and the second coil are further coupled to a third coil, the compressor being operable to compress refrigerant and pump the refrigerant out of a first compressor opening into the first and second coils and receive the refrigerant through a second compressor opening after the refrigerant has passed through the third coil;

one or more first fans operable to blow ambient air across the first coil;

one or more second fans operable to blow ambient air across the second coil;

a first expansion valve coupled to and positioned between the first coil and the third coil;

a second expansion valve coupled to and positioned between the second coil and the third coil;

one or more sensors positioned to sense a pressure of the refrigerant circulating through the system; and a controller operable to trigger a low ambient temperature mode to:

configure the first coil as an active coil by energizing one or more of the first fans;

configure the second coil as an inactive coil by de-energizing the one or more second fans;

monitor the refrigerant pressure based on data received from the one or more sensors;

in response to determining that the refrigerant pressure is below a low threshold pressure:

operate the first expansion valve to reduce refrigerant flow into the first coil and increase refrigerant flow through the second coil and into the third coil;

determine whether the first expansion valve is closed; and in response to determining that the first expansion valve is closed, shut off the compressor and the one or more first fans; and in response to determining that the refrigerant pressure is above a high threshold pressure, operate the second expansion valve to reduce refrigerant flow through the second coil and increase refrigerant flow through the first coil and into the third coil.

2. The system of claim 1, wherein, in response to determining that the refrigerant pressure is above the high threshold pressure, the controller is further operable to increase a speed of at least one of the one or more first fans.

3. The system of claim 1, wherein the first coil and the second coil are positioned outside a building and the third coil is positioned inside a building.

4. The system of claim 1, wherein the controller is operable to trigger the low ambient temperature mode in response to determining that an ambient temperature is below a threshold temperature.

5. The system of claim 4, wherein at least some of the refrigerant condenses as it passes through the first coil and the second coil.

6. The system of claim 4, wherein at least some of the refrigerant evaporates as it passes through the third coil.

7. An apparatus comprising:
a memory operable to store a threshold temperature, a low threshold pressure, and a high threshold pressure; and
a processor operable to:
configure a first coil as an active coil by energizing one or more fans operable to blow ambient air across the first coil;

configure a second coil as an inactive coil by de-energizing each of one or more fans operable to blow ambient air across the second coil;

receive information from one or more remote sensors, the information comprising a pressure of refrigerant that is compressed by a compressor and ambient temperature information;

trigger a low ambient temperature mode in response to receiving ambient temperature information indicating an ambient temperature below the threshold temperature;

in response to triggering the low ambient temperature mode, monitor the refrigerant pressure based on the information received from the one or more remote sensors;

in response to determining that the refrigerant pressure is below the low threshold, pressure:

operate a first expansion valve coupled to the first coil to reduce refrigerant flow into a third coil through the first coil, wherein the third coil is coupled to the first coil and the third coil is further coupled to the compressor;

determine whether the first expansion valve is closed; and in response in determining that the first expansion valve is closed, shut off the compressor and the one or more fans operable to blow ambient air across the first coil; and in response to determining that the refrigerant pressure is above the high threshold pressure, operate a second expansion valve coupled to a second coil to reduce refrigerant flow into the third coil through the second coil, wherein the second coil is coupled to the third coil.

8. The apparatus of claim 7, wherein in response to determining that the refrigerant pressure is above the high threshold pressure, the processor is further operable to increase a speed of at least one of the one or more fans operable to blow ambient air across the first coil.

9. The apparatus of claim 7, wherein the first coil and the second coil are positioned outside a building and the third coil is positioned inside a building.

10. The apparatus of claim 9, wherein at least some of the refrigerant evaporates as it passes through the third coil.

11. The apparatus of claim 9, wherein at least some of the refrigerant condenses as it passes through the first and second coils.

12. The apparatus of claim 7, wherein the processor is operable to receive ambient temperature information from a remote temperature sensor.

13. The system of claim 1, wherein at least one of the one or more sensors is positioned internal to the compressor.

14. The system of claim 1, wherein at least one of the one or more sensors is positioned external to the compressor.

15. The system of claim 1, wherein at least one of the one or more sensors senses the refrigerant pressure at a suction of the compressor.

16. The system of claim 1, wherein at least one of the one or more sensors senses the refrigerant pressure at a discharge of the compressor.

* * * * *

UNITED STATES PATENT AND TRADEMARK OFFICE
CERTIFICATE OF CORRECTION

PATENT NO. : 10,337,780 B2  
APPLICATION NO. : 14/930357  
DATED : July 2, 2019  
INVENTOR(S) : Der-Kai Hung Page 1 of 1

It is certified that error appears in the above-identified patent and that said Letters Patent is hereby corrected as shown below:

In the Claims

In Column 12, Line 17, please delete, "is below the low threshold, pressure:" and please insert -- is below the low threshold pressure: --, therefor.

In Column 12, Line 25, please delete, "in response in determining that..." and please insert -- in response to determining that... --, therefor.

In Column 12, Line 31, please delete, "...coupled to a second coil..." and please insert -- "...coupled to the second coil... --, therefor.

Signed and Sealed this  
Third Day of May, 2022

Katherine Kelly Vidal  
*Director of the United States Patent and Trademark Office*